(12) United States Patent
Liang et al.

(10) Patent No.: US 7,401,758 B2
(45) Date of Patent: Jul. 22, 2008

(54) IN MOLD MANUFACTURE OF AN OBJECT WITH EMBEDDED DISPLAY PANEL

(75) Inventors: Rong-Chang Liang, Cupertino, CA (US); Scott C. J. Tseng, San Jose, CA (US); Jerry Chung, Mountain View, CA (US); HongMei Zang, Sunnyvale, CA (US); Xiaojia Wang, Fremont, CA (US); Yi-Shung Chaug, Cupertino, CA (US); Feng Y. Dai, Cerritos, CA (US)

(73) Assignee: SiPix Imaging, Inc., Fremont, CA (US)

( * ) Notice: Subject to any disclaimer, the term of this patent is extended or adjusted under 35 U.S.C. 154(b) by 79 days.

(21) Appl. No.: 10/860,992

(22) Filed: Jun. 3, 2004

(65) Prior Publication Data
US 2005/0163940 A1 Jul. 28, 2005

Related U.S. Application Data

(60) Provisional application No. 60/476,852, filed on Jun. 6, 2003.

(51) Int. Cl.
*B29C 45/14* (2006.01)
*B29B 7/22* (2006.01)
(52) U.S. Cl. .................... 249/112; 264/271.1
(58) Field of Classification Search ................. 428/1.1; 220/4.02, 4.05, 4.07, 62.14, 62.15, 62.22; 349/58; 264/255, 259–279.1; 359/296; 249/112
See application file for complete search history.

(56) References Cited

U.S. PATENT DOCUMENTS

| | | | |
|---|---|---|---|
| 4,059,471 A | 11/1977 | Haigh | |
| 4,084,032 A | 4/1978 | Pasersky | |
| 4,175,883 A | 11/1979 | Lemelson | |
| 4,202,663 A | 5/1980 | Haigh, deceased et al. | |
| 4,275,116 A | 6/1981 | Kratschmer | |
| 4,369,157 A | 1/1983 | Conner | |
| 4,465,728 A | 8/1984 | Haigh, deceased et al. | |
| 4,477,312 A | 10/1984 | Czichy | |
| 4,526,818 A * | 7/1985 | Hoshikawa et al. | .......... 428/1.5 |
| 4,597,815 A | 7/1986 | Nakamura | |
| 4,601,936 A | 7/1986 | Ghavamikia | |

(Continued)

FOREIGN PATENT DOCUMENTS

EP 0 458 016 11/1991

(Continued)

OTHER PUBLICATIONS

U.S. Appl. No. 09/518,488, filed Mar. 2000, Liang et al.

(Continued)

*Primary Examiner*—Terrel Morris
*Assistant Examiner*—Sophie Hon
(74) *Attorney, Agent, or Firm*—Howrey LLP (57) ABSTRACT

This invention relates to an object having a display panel embedded in its top surface and processes for its manufacture. This invention also relates to an in-mold display transfer film or foil, which comprises a temporary carrier film, a release layer, a display panel, an adhesive or tie layer and optionally a durable layer.

15 Claims, 6 Drawing Sheets

U.S. PATENT DOCUMENTS

| | | | |
|---|---|---|---|
| 4,643,789 A | 2/1987 | Parker et al. | |
| 4,650,533 A | 3/1987 | Parker et al. | |
| 4,710,419 A | 12/1987 | Gregory | |
| 4,855,097 A | 8/1989 | Iseler et al. | |
| 4,917,927 A | 4/1990 | Sakaitani et al. | |
| 4,944,908 A | 7/1990 | Leveque et al. | |
| 4,954,070 A | 9/1990 | Dunlap | |
| 4,976,896 A | 12/1990 | Short et al. | |
| 5,013,508 A | 5/1991 | Troester | |
| 5,026,592 A | 6/1991 | Janocha et al. | |
| 5,034,077 A | 7/1991 | Pata | |
| 5,104,707 A * | 4/1992 | Watanabe et al. | 428/40.9 |
| 5,112,462 A | 5/1992 | Swisher | |
| 5,147,950 A | 9/1992 | Kelsey | |
| 5,152,861 A | 10/1992 | Hann | |
| 5,164,135 A | 11/1992 | Parker et al. | |
| 5,192,609 A | 3/1993 | Carroll, Jr. | |
| 5,215,811 A | 6/1993 | Reafler et al. | |
| 5,391,344 A | 2/1995 | Rains et al. | |
| 5,393,474 A | 2/1995 | Souders | |
| 5,401,457 A | 3/1995 | Valyi | |
| 5,416,144 A * | 5/1995 | Stein et al. | 524/188 |
| 5,435,956 A | 7/1995 | McCrory | |
| 5,512,226 A | 4/1996 | Rosica et al. | |
| 5,514,317 A | 5/1996 | Rosica et al. | |
| 5,514,427 A | 5/1996 | Ellison et al. | |
| 5,536,539 A | 7/1996 | Ellison et al. | |
| 5,599,608 A | 2/1997 | Yamamoto et al. | |
| 5,653,907 A | 8/1997 | Kendall et al. | |
| 5,658,672 A | 8/1997 | Lenke et al. | |
| 5,679,301 A | 10/1997 | Miklas et al. | |
| 5,681,515 A | 10/1997 | Pratt et al. | |
| 5,707,472 A | 1/1998 | Smith | |
| 5,718,326 A * | 2/1998 | Larose et al. | 200/314 |
| 5,746,962 A | 5/1998 | Yamamoto | |
| 5,759,477 A | 6/1998 | Yamamoto | |
| 5,783,276 A | 7/1998 | Lyford | |
| 5,795,527 A | 8/1998 | Nakamura et al. | |
| 5,800,757 A | 9/1998 | Abrams et al. | |
| RE35,970 E | 11/1998 | Ellison et al. | |
| 5,869,150 A * | 2/1999 | Iwamoto | 428/1.52 |
| 5,904,886 A | 5/1999 | Stecker | |
| 5,916,643 A | 6/1999 | Spain et al. | |
| 5,935,692 A | 8/1999 | Smith | |
| 5,940,527 A | 8/1999 | Takeo | |
| 5,954,601 A | 9/1999 | Abrams et al. | |
| 5,955,204 A | 9/1999 | Yamamoto et al. | |
| 5,968,657 A | 10/1999 | Scullin et al. | |
| 5,972,279 A | 10/1999 | Harris et al. | |
| 5,985,198 A | 11/1999 | Harris et al. | |
| 5,993,588 A | 11/1999 | Nakamura | |
| RE36,457 E | 12/1999 | Ellison et al. | |
| 6,006,419 A * | 12/1999 | Vandendolder et al. | 29/600 |
| 6,019,923 A | 2/2000 | Pelzer | |
| 6,067,135 A * | 5/2000 | Shimizu et al. | 349/86 |
| 6,083,335 A | 7/2000 | Scullin et al. | |
| 6,103,168 A | 8/2000 | Kelly | |
| 6,117,384 A | 9/2000 | Laurin et al. | |
| 6,143,227 A | 11/2000 | Heiden et al. | |
| 6,180,195 B1 | 1/2001 | Ellison et al. | |
| 6,197,242 B1 | 3/2001 | Parks et al. | |
| 6,216,329 B1 * | 4/2001 | Kaga et al. | 29/458 |
| 6,221,304 B1 | 4/2001 | Harris et al. | |
| 6,245,182 B1 | 6/2001 | Nakamura | |
| 6,245,183 B1 | 6/2001 | Iorio et al. | |
| 6,251,304 B1 | 6/2001 | Wegh et al. | |
| 6,291,369 B1 | 9/2001 | Yoshikawa et al. | |
| 6,309,586 B1 | 10/2001 | Colley et al. | |
| 6,326,086 B1 | 12/2001 | Mori et al. | |
| 6,382,448 B1 | 5/2002 | Yuhara et al. | 220/4.02 |
| 6,387,472 B1 | 5/2002 | Reck et al. | |
| 6,458,913 B1 | 10/2002 | Honigfort et al. | |
| 6,465,102 B1 | 10/2002 | Honigfort et al. | |
| 6,482,346 B1 * | 11/2002 | Alcazar | 264/263 |
| 6,527,898 B1 | 3/2003 | Nakamura | |
| 6,930,818 B1 * | 8/2005 | Liang et al. | 359/296 |
| 7,037,455 B2 * | 5/2006 | Marine | 264/130 |
| 2002/0075556 A1 * | 6/2002 | Liang et al. | 359/296 |
| 2002/0126249 A1 * | 9/2002 | Liang et al. | 349/187 |

FOREIGN PATENT DOCUMENTS

| | | |
|---|---|---|
| EP | 1 219 401 | 4/2002 |
| GB | 2 364 445 | 1/2002 |
| JP | 2001-310580 | 11/2001 |
| JP | 2003-123639 | 4/2003 |
| WO | PCT/US2004/013247 | 1/2005 |

OTHER PUBLICATIONS

U.S. Appl. No. 09/759,212, filed Jan. 2001, Liang et al.
U.S. Appl. No. 09/879,408, filed Jun. 2001, Chen et al.
U.S. Appl. No. 10/178,990, filed Nov. 2003, Liang et al.
U.S. Appl. No. 10/198,729, filed Jul. 2002, Liang et al.
U.S. Appl. No. 10/222,036, filed Aug. 2002, Liang et al.
U.S. Appl. No. 10/422,413, filed Apr. 2003, Chung et al.
U.S. Appl. No. 10/422,557, filed Apr. 2003, Chaug et al.
U.S. Appl. No. 10/447,719, filed May 2003, Chung et al.
U.S. Appl. No. 60/375,936, filed Apr. 2003, Chung et al.
Drzaic, P.S., "Liquid Crystal Dispersions", World Scientific Publishing Co. (1995), List of Contents.
Feely, W.E., Imhof, J.C., & Stein, C.M., "The Role of the Latent Image in a New Dual Image, Aqueous Developable, Thermally Stable Photoresist", Polymer Engineering and Science, Mid-September, 26(6), (1986), pp. 1101-1104.
Hattori, R., et al, "Novel Type of Bistable Reflective Display using Quick Response Liquid Powder", SID 03 Digest, p. 846 (2003).
Macko, J.A., & Ishida, H., "Structural Effectis of Phenols on the Photooxidative Degradation of Polybenzoxazines", Polymer, 42, (2001), pp. 227-240.
Pham, T., et al, "Electro-Optical Characteristics of the Gyricon Display", SID 02 Digest, p. 119 (2002).
Wicks, Z.W. Jr., "Blocked Isocyanates", Progress in Organic Coatings, (1975), vol. 3, pp. 73-99.
Wu, S-T. & Yang, D-K., "Reflective Liquid Crystal Displays", John Wiley & Sons, (2001).
Liang, L.C. (Apr. 2004). *Microcup Electronic Paper by Roll-to-Roll Manufacturing Process*. Presentation at the Flexible Displays & Electronics 2004 of Intertech, San Fransisco, California, USA.
Society of Information Display. (2004). *Information Display, SID 2004 Reivew Issue*, 20(3&4), 37-38.
Wang, X., Kiluk, S., Chang, C., Wu, Y., & Liang, R.C. (Feb. 2004). *Mirocup (R) Electronic Paper and the Converting Processes*. Paper presented at the ASID, Nanjing, China. (in Chinese, English translation attached.).
Zang, H.M. (Feb. 2004). *Microcup Electronic Paper*. Presentation conducted at the Displays & Microelectronics Conference of U.S. Display Consortium, Phoenix, Arizona, USA.
Zang, H.M, Hwang, J.J., Gu, H., Hou, J., Weng, X., Chen, Y., et al. (Jan. 2004). *Threshold and Grayscale Stability of Microcup (R) Electronic Paper*. Presentation conducted at the 16th Annual Symposium—Electronic Imaging Science and Technology of IS&T/SPIE, San Jose, California, USA.
Ho, C.,& Liang, R.C. (Dec. 2003). *Microcup (R) Electronic Paper by Roll-to-Roll Manufacturing Processes*. Presentation conducted at FEG, Nei-Li, Taiwan.
Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.
Zang, H.M. (Oct. 2003). *Microcup (R)Electronic Paper by Roll-to-Roll Manufacturing Processes*. Presentation conducted at the Advisory Board Meeting, Bowling Green State University, Ohio, USA.
Allen, K. (Oct. 2003). Electrophoretics Fulfilled. *Emerging Displays Review: Emerging Display Technologies*, Monthly Report October 2003, 9-14.

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached, full translation available upon request).

Lee, H., & Liang, R.C. (Jun. 2003) SiPix Microcup(R) Electronic Paper—An Introduction. *Advanced Display*, 3, 4-9 (in Chinese, English abstract attached, full translation available upon request).

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Chen, S.M. (May 2003) The New Applications and the Dynamics of Companies. TRI. 1-10. (In Chinese, English abstract attached, full translation availabe upon request).

Liang, R.C., Hou, J., Zang, H.M., Chung, J., & Tseng, S. (2003). Microcup(R) displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdives. (Dec. 2002) Newly-Developed Color Electronic Paper Promises—Unbeatable Production Efficiency. *Nikkei Microdevices*, 3. (in Japanese, with English translation).

Allen, K. (May 2004). Emerging Displays Come Roaring Back. *Emerging Displays Review: Emerging Display Technologies*, Monthly Report—May 2004, 21-23.

Allen, K. (May 2004). Passive Displays Staging a Comback. *Emerging Displays Review: Emerging Display Technologies*, Monthly Report—May 2004, 19-20.

Allen, K. (May 2004). Sign Me Up! *Emerging Displays Review: Emerging Display Technologies*, Monthly Report—May 2004, 12-13.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, l9.6.1.

Chin, S. (May 2004) *Electronic Paper Supplier to Work With Philips Venture* (online). EETimes [retrieved on Jun. 11, 2004]. Retrieved from the Internet: URL : http://www.eetimes.com/sys/news/showArticle.jhtml?articleID=21100323.

*Collaboration to Roll Out Electronic Paper* (online). Laser Focus World Magazine, 2004 [retrieved on Jun. 11, 2004]. Retrieved from the Internet: URL : http://lfw.pennnet.com/Articles/Article_Display.cfm?Section=OnlineArticles&SubSection=Display&PUBLICATION_ID=12&ARTICLE_ID=205374.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Paultre, A.L. (May 2004) *Imaging Industry Displays Visions of the Future : Display Innovations and New Technologies are Raising Industry Eyebrows* (online). Electronic Products [retrieved on Jun. 11, 2004]. Retrieved from inthe Internet : URL : http://www.electronicproducts.com/ShowPage.asp?SECTION=3700&PRIMID=&FileName=augOL1.aug2003.

*SiPix Announces First Retail Customer ; Electronic Papter Finds its First << Killer Application >>* (online). TMCNet.com, 2004 [retrieved on Jun. 11, 2004]. Retrieved from the Internet : URL : www.tmcnet.com/usubmit/2004/May/1043846.htm.

*SiPix Enters Joint Development wit hPhilips* (online). Azcom.com, 2004 [retrieved on Jun. 11, 2004]. Retrieved from the Internet : URL : www.azom.com/news.asp?newsID=1449.

*SiPix Enters Joing Development Agreement ; Partnership to Build the Most Rollable, Flexible Display in the World* (online). TMCNet.com, 2004 [retrieved on Jun. 11, 2004]. Retrieved from the Internet : URL : www.tmcnet.com/usubmit/2004/May/1043845.htm.

*SiPix, Polymer to Create Rollable, Flexible Display* (online). Eetasia.com, 2004 [retrieved on Jul. 2, 2004]. Retrieved from the Internet : URL not available.

* cited by examiner

IN MOLD MANUFACTURE OF AN OBJECT WITH EMBEDDED DISPLAY PANEL

CROSS REFERENCE TO RELATED APPLICATIONS

This application claims the benefit of U.S. Provisional Application Ser. No. 60/476,852, filed Jun. 6, 2003, the content of which is incorporated herein by reference in its entirety.

BACKGROUND OF THE INVENTION

1. Field of the Invention

This invention relates to an object having a display panel embedded in its top surface and processes for its manufacture.

2. Description of Related Art

Currently, for an object having a display panel, the object and the display panel are manufactured separately and the two components are then assembled together. The assembly of such an object usually requires mechanical integration or lamination, which typically results in a large gap between the object and the display and also an increase in the total thickness or volume of the object. Therefore, the current methods cannot meet certain product requirements such as style, compactness and durability, which features are especially important for handheld devices.

SUMMARY OF THE INVENTION

The first aspect of the invention is directed to an object having a display panel embedded in its top surface. There may also be decorative designs (e.g., text or graphic) appearing on the top surface.

The second aspect of the invention is directed to an in-mold display transfer film or foil.

The third aspect of the present invention is directed to an in-mold display insertion film or foil. In this aspect of the invention, a display panel may be formed on a carrier film comprising an electrode layer.

The display panel in the in-mold display transfer film or foil or in the in-mold display insertion film or foil may be any plastic-based displays such as polymer dispersed liquid crystal displays (PDLCs), cholesteric liquid crystal displays (ChLCD), organic light emitting devices (OLEDs), electrophoretic displays (EPDs) or other particle based displays.

The fourth aspect of the invention is directed to processes for the manufacture of an object of the first aspect of the invention.

The present invention has a wide variety of applications. For example, the object may be a plastic cover of a cell phone or pager and the display panel embedded in the top surface may display text messages, time and dates and/or colored or flashing signals alerting the user to incoming phone calls or number of voice mail messages. In fact, the invention is useful for any objects which are made of a plastic material, such as personal accessories (e.g., handbags or wallets), toys or educational devices, plastic cover of a personal digital assistant or e-book, credit or smart cards, identification or business cards, the face of an album, watch, clock, radio or camera, the dashboard in an automobile, household items (e.g., cups, dishes or bottles), laptop computer housings and carrying cases or front control panels of any consumer electronic equipments. This list is clearly not exhaustive. Other applications would be clear to a person skilled in the art and therefore they are all encompassed within the scope of the present invention.

When a plastic display is embedded in an object, the seamless integration produces a very appealing look. The display panel may conform to the object surface, even if the surface is curved. As a result, the display panel may appear as one integral or printed part of the object. According to the present invention, large size plastic displays may also be embedded in an object, which would be impossible to achieve with traditional display assembly technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
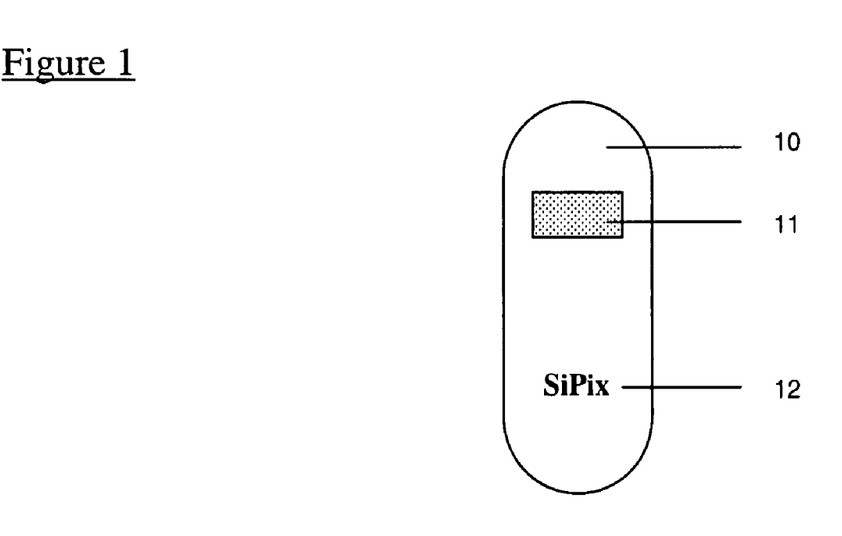
FIG. 1 shows the top view of an object of the present invention.

FIG. 1 shows the top view of an object (10) comprising a display panel (11) embedded in its top surface. Text or graphic design (12) may also optionally appear on the top surface. The term "embedded", in the context of the present invention, is intended to indicate that the display panel is integrated into the top surface of the object when the object is being formed, not after the object is formed.

The manufacturing process suitable for the formation of the object may include, for example, hot stamping, lamination, injection molding, thermoforming, compression molding or blow molding. Examples of the material suitable for the object in the stamping, lamination or molding process may include, but are not limited to, thermoplastic materials such as polystyrene, polyvinyl chloride, acrylics, polysulfone, polyarylester, polypropylene oxide, polyolefins, acrylonitrile-butadiene-styrene copolymers (ABS), methacrylate-acrylonitrile-butadiene-styrene copolymers (MABS), polycarbonate, polybutylene terephthalate (PBT), polyethylene terephthalate (PET), polyurethanes and other thermoplastic elastomers or blends thereof, and thermoset materials such as reaction injection molding grade polyurethanes, epoxy resin, unsaturated polyesters, vinylesters or composites, prepregs and blends thereof.

(I) In-Mold Display Transfer Films or Foils

In the manufacture of the object of the present invention, an in-mold display transfer film or foil comprising a display panel is first prepared.

Although the term "in-mold" is used throughout this application, it is understood that the present invention can be extended to processes such as stamping, lamination or a combination of stamping or lamination and a molding process.

Figure 2A:
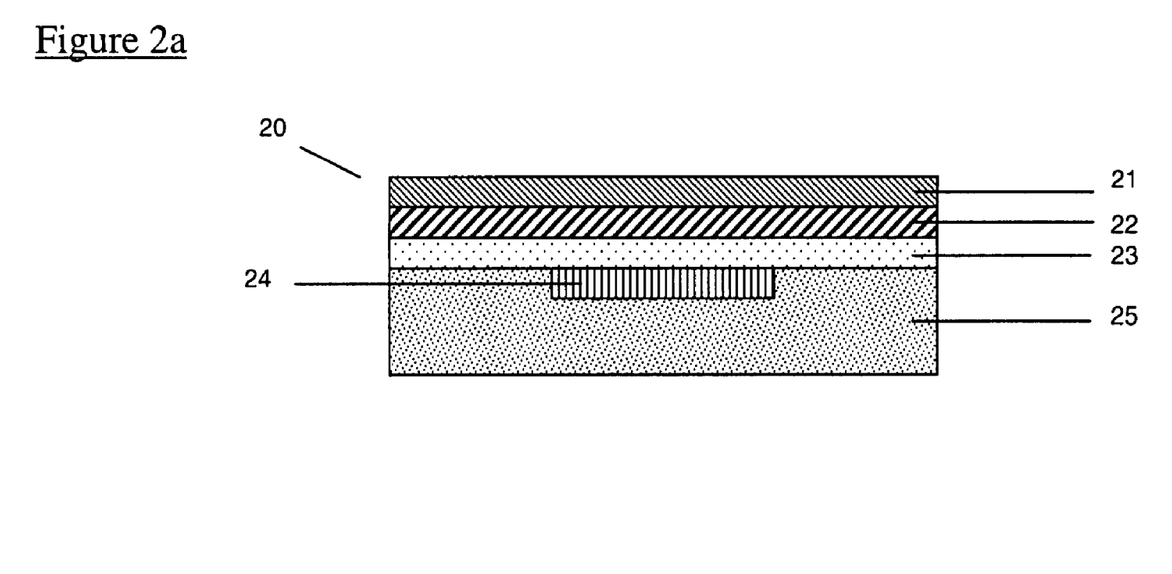
FIG. 2a is a cross-section view of an in-mold transfer film or foil comprising a display panel.

FIG. 2a is a cross-section view of such an in-mold display transfer film or foil (20) which comprises a temporary carrier layer (21), a release coating (22), an optional durable coating (23), a display panel (24) and an adhesive or tie-coat layer (25). The release layer (22), the durable layer (23) if present, the display panel (24) and the adhesive layer (25) are sequentially coated or laminated onto the carrier film (21) and these different layers are collectively referred to as the "in-mold display transfer film or foil" throughout this application for ease of illustration.

In the in-mold transfer process, the in-mold display transfer film or foil is fed into the mold with the temporary carrier layer (21) in contact with the mold surface.

The key element, the display panel (24) may be a particle-based display such as a flipping ball display as described in T. Pham, et al, SID 02 Digest, p. 119 (2002); a liquid powder display as described in R. Hattori, et al, SID 03 Digest, p. 846 (2003); or an electrophoretic display, particularly a Microcup® EPD as disclosed in co-pending applications, U.S. Ser. No. 09/518,488 (corresponding to PCT/US01/06917), U.S. Ser. No. 09/879,408 (corresponding to WO02/100155), U.S. Ser. No. 10/447,719 (corresponding to WO03/102673), U.S. Ser. No. 10/422,413 (corresponding to WO03/91798), U.S. Ser. No. 10/422,557 (corresponding to WO03/91788) and U.S. Ser. No. 60/375,936, the contents of all of which cited above are incorporated herein by reference.

The electrophoretic display may have a traditional up/down switching mode. It may have an in-plane or a dual switching mode as disclosed in co-pending applications, U.S. Ser. No. 10/198,729 (corresponding to WO03/009059) and U.S. Ser. No. 10/222,036 (corresponding to WO03/016993) respectively, the contents of both are incorporated herein by reference.

The display panel may also be an OLED (organic light emitting device), a PLED (polymer light emitting device) or a liquid crystal display, particularly a polymer dispersed liquid crystal (PDLC), Microcup® LCD [as disclosed in co-pending applications, U.S. Ser. No. 09/759,212 (corresponding to WO02/56097) and U.S. Ser. No. 10/178,990, the contents of both are incorporated herein by reference] or a cholesteric liquid crystal device (ChLCD). Reviews of reflective displays including PDLC and OLED/PLED can be found in the books, P. S. Drzaic, "Liquid Crystal Dispersions", World Scientific Publishing Co. (1995); S-T. Wu and D-K, Yang "Reflective Liquid Crystal Displays", John Wiley & Sons, (2001); and R. Hattori, et al, SID 03 Digest, p. 846 (2003), respectively, the contents of all of which are also incorporated herein by reference.

The display panel is preferably thin and flexible and the substrate used for the formation of the display panel preferably has a high heat distortion temperature to allow the display to withstand the process conditions in the transferring process, such as injection molding or other molding conditions. A plastic based display panel is preferred. The term "a plastic-based display panel", in the context of the present invention, refers to a display panel which is formed on a plastic substrate layer, sandwiched between two plastic substrate layers or sandwiched between a transparent plastic layer and an insulator-coated thin metal or metal oxide foil or a glass sheet. The metal or metal oxide foil may be formed from steel such as carbon steel or stainless steel, Al, Sn, Ni, Cu, Zn, Mg or alloys, oxides, composites or blends thereof.

Figure 2B:
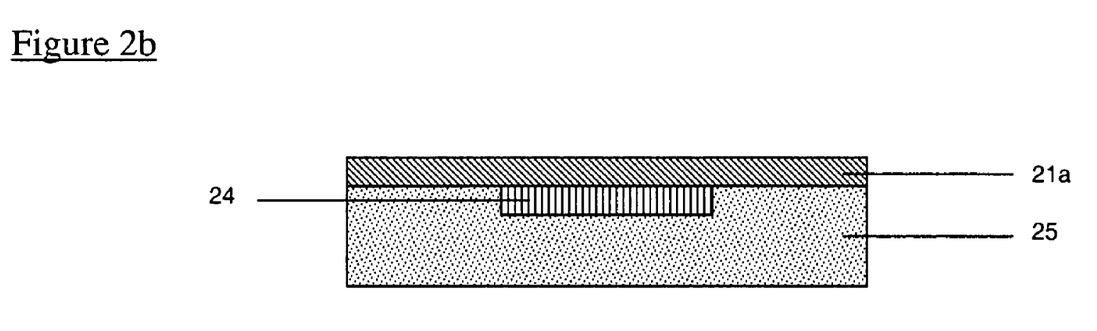
FIG. 2b is a cross-section view of an in-mold insertion film or foil comprising a display panel.
Figure 2C:
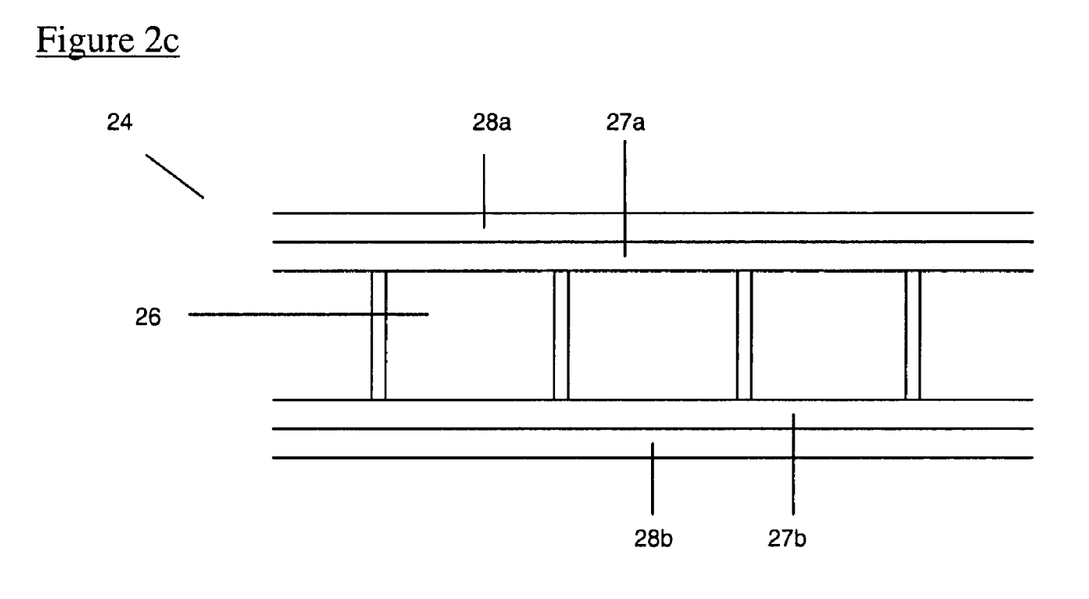
FIG. 2c is an enlarged view of a typical plastic-based display panel.

FIG. 2c is an enlarged view of a plastic-based Microcup® display panel. The panel (24) has a plurality of display cells (26), a top electrode plate (27a) and a bottom electrode plate (27b). The display panel may be formed on a bottom plastic substrate layer (28b), laminated with a top plastic substrate layer (28a) or both. Suitable materials for the plastic substrate layer(s) may include polyethylene terephthalate (PET), polybutylene terephthalate (PBT), polyethylene naphthalate (PEN), polyolefins including polycyclic olefins, polycarbonate (PC), polymethyl methacrylate (PMMA), polysulfone, polyimide (PI), polyarylester, polystyrene, polyurethane, polysiloxane and copolymers, blends or composites thereof, with PET, PBT, PEN and PC as preferred.

In a Microcup®-based display, the display cells (26) are individually top-sealed with a sealing layer formed from a material selected from the group consisting of thermoplastics, thermoplastic elastomers, thermosets and precursors thereof.

For the display panel, either the side of the top electrode layer (27a) or the side of the bottom electrode layer (27b) may be the viewing side. In other words, in the in-mold display transfer film or foil, either the side of the top electrode layer or the side of the bottom electrode layer may be in contact with the release layer (22) or the durable layer (23), if present, in the molding process.

In the case of in-plane switching EPD which comprises an in-plane electrode substrate and an insulator substrate, the viewing side is preferably the insulator side to simplify the connection to the display driver and outside circuitries.

The temporary carrier layer (21) usually is a thin plastic film with a thickness from about 3.5 to about 50 microns. PET, PEN and PC films are particularly preferred because of their low cost, high transparency and thermomechanical stability.

The release coating (22) of the in-mold transfer display film allows the display panel coating to release from the carrier in a manner that minimizes damage to the display panel and enables a fully automated roll transfer process during molding.

The release coating usually is a low surface tension coating prepared from a material such as wax, paraffin or silicone or a highly smooth and impermeable coating prepared from a material such as radiation curable multifunctional acrylates, silicone acrylates, epoxides, vinyl esters, vinyl ethers, allyls and vinyls, unsaturated polyesters or blends thereof. The release layer may comprise a condensation polymer, copolymer, blend or composite selected from the group consisting of epoxy, polyurethane, polyimide, polyamide, melamine formaldehyde, urea formaldehyde and phenol formaldehyde.

The optional durable coating (23) serves as a protective layer to the display panel (24) and the ink or metal patterns, if present. Suitable raw materials for the durable coating may include, but are not limited to, radiation curable multifunctional acrylates including epoxy acrylates, polyurethane acrylates, polyester acrylates, silicone acrylates, glycidyl acrylates, epoxides, vinyl esters, diallyl phthalate, vinyl ethers and blends thereof. The optional durable coating may comprise a condensation polymer or copolymer, such as epoxy, polyurethane, polyamide, polyimide, melamine formaldehyde, urea formaldehyde or phenol formaldehyde. The optional durable coating may comprise a sol-gel silicate or titanium ester.

The durable layer of the in-mold transfer display film may be partially or fully cured. If partially cured, a post curing step will be employed after the molding and/or transferring step to enhance the durability, particularly hardness, scratch and oil resistance.

To improve the release properties, the raw material, particularly the low molecular weight components of the durable layer is preferably not permeable into the release layer. After the durable layer is coated and cured or partially cured, it should be marginally compatible or incompatible with the release layer. Binders and additives such as thickeners, surfactants, dispersants, UV stabilizers or antioxidants may be used to control the rheology, wettability, coating properties, weatherability and aging properties. Fillers such as silica, $Al_2O_3$, $TiO_2$, $CaCO_3$, microcrystalline wax or polyethylene, Teflon or other lubricating particles may also be added to improve, for example, scratch resistance and hardness of the durable layer. The durable layer is usually about 2 to about 20 microns, preferably about 3 to about 8 microns in thickness. The durable layer in the areas covering the display panel is preferably transparent.

When the durable layer (23) is not present, the top substrate layer (28a) or the bottom substrate layer (28b) in the display panel (24) may serve as a protective layer. In this case, the display substrate layer on the viewing side may extend beyond the display panel area and covers part or all of the release film of the transfer film or foil. The display panel (24) may be laminated directly onto the release layer or the durable layer, if present, optionally with an adhesive (not shown).

The adhesive layer (25) is incorporated into the display panel coating to provide optimum adhesion of the display panel (24) and the ink or metal patterns, if present, to the top surface of the molded object. The adhesive layer may be formed from a material such as polyacrylate, polymethacrylate, polystyrene, polycarbonate, polyurethane, polyester, polyamide, epoxy resin, ethylene vinylacetate copolymers (EVA), thermoplastic elastomers or the like, or copolymers, blends or composites thereof. Hot melt or heat activated adhesives such as polyurethane and polyamide are particularly preferred. The thickness of the adhesive layer may be in the range of about 1 to about 20 microns, preferably in the range of about 2 to about 6 microns.

If a durable layer is present, printed ink or metal patterns may be present between the display panel (24) and the durable layer (23) or between the durable layer (23) and the adhesive layer (25) in the areas that no display is present. If the durable layer is not present, the printed ink or metal patterns may be present on the display panel as illustrated in Section IV below.

(II) In-Mold Display Insertion Films or Foils

FIG. 2b is a schematic cross-section view of an in-mold display insertion film or foil. In this case, the carrier layer (21a) will become part of the finished product after the stamping, lamination or a molding process. The display panel (24) may be laminated onto the carrier film (21a) with an adhesive layer (not shown) and optionally over-coated on the other side with a hot melt or heat activated adhesive (25). Alternatively, the display panel may be prepared directly on the carrier film by methods known in the art, for example, the methods as described in co-pending application, U.S. Ser. No. 09/518, 488. In this case, the carrier film may comprise a transparent electrode layer such as indium-tin oxide (ITO).

Similar to the in-mold display transfer film or foil, printed ink and metal patterns may be present between the display panel and the carrier film or between the carrier film and the adhesive layer (25) in the areas that no display is present. These different layers are collectively referred to as the "in-mold display insertion film or foil" throughout this application for ease of illustration.

(III) Manufacture of the Object

Figure 3A:
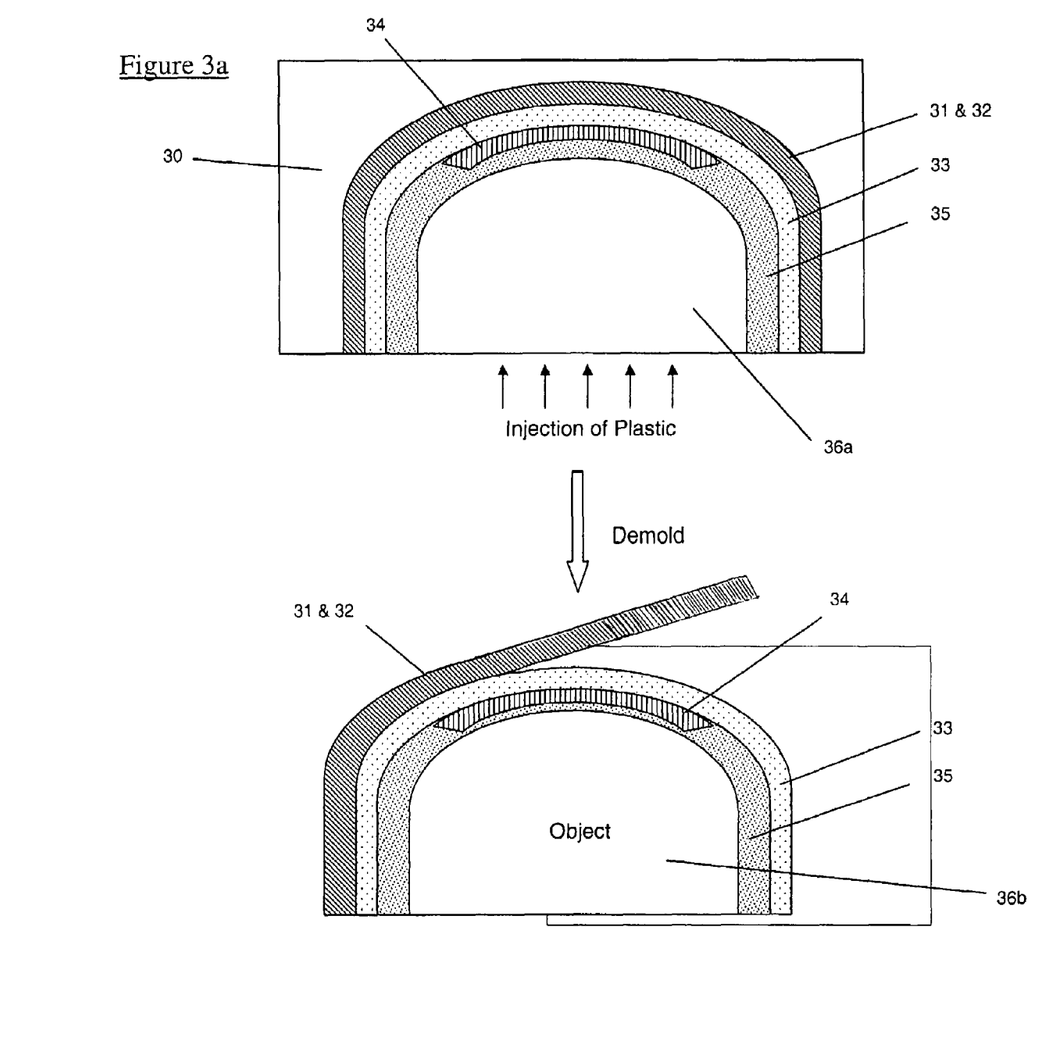
FIG. 3a is the cross-section view of an injection molding process involving an in-mold transfer film or foil.

A typical in-mold transfer process is illustrated in FIG. 3a. In the molding process, the in-mold display transfer film or foil is on a roll or web continuously fed into a molding machine. The mold (30) may be an injection or compression mold for the object (36b). During the molding process, the mold is closed and the plastic melt for the formation of the object is injected into the mold cavity (36a) through injection nozzles and runners. After molding, the display panel, the durable layer if present, and also the ink and metal decoration patterns, if present, are transferred onto the molded object. The molded object is removed from the mold. The temporary carrier layer (31) and the release layer (32) are also simultaneously removed leaving the durable coating (33), if present, to be the top-most layer on the surface of the object with the display panel (34) embedded underneath as an integral part of the object. The layer (35) is an adhesive layer.

To facilitate the registration of the display transfer film to the mold, the roll or web may be pre-printed with registration marks and continuously fed into the mold with registration by, for example, an optical sensor.

When the durable layer (33) is not present, one of the plastic substrate layers of the display panel (34) would be the top-most layer on the surface of the object.

Figure 3B:
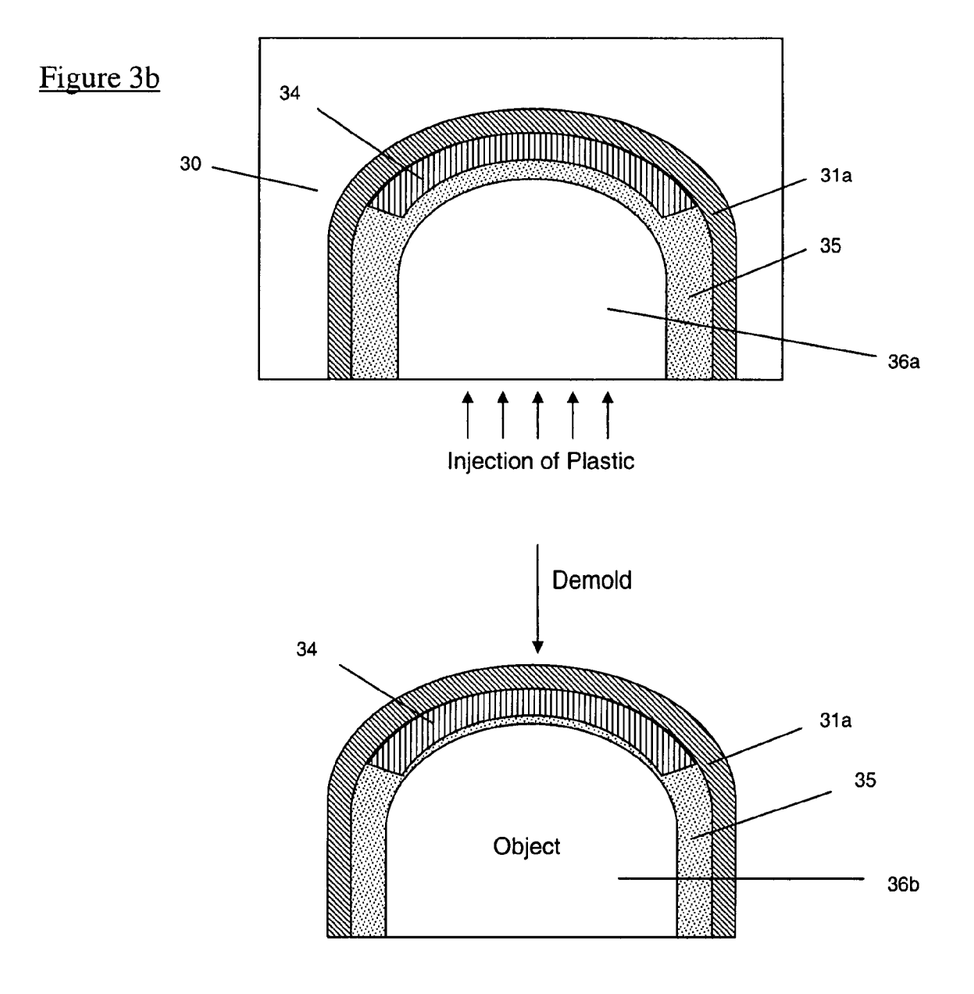
FIG. 3b is the cross-section view of an injection molding process involving an in-mold insertion film or foil.

In an in-mold insertion process as illustrated in FIG. 3b, an in-mold display insertion film or foil is first cut into an appropriate size and shape and then inserted into a mold (30). The in-mold display insertion film is placed against the mold wall as shown, optionally under vacuum. The display panel coating can be placed manually, an electrostatic charge may be used to facilitate its insertion or the insertion may be mechanized. Mechanized insertion is advantageous especially for large volume production.

The carrier layer (31a) of the display insertion film is in contact with the inner wall surface of the mold. The mold is then closed and the plastic melt for the formation of the object (36b) is injected into the mold cavity (36a) through injection nozzles and runners. The carrier film (31a) in this case may become an integrated part of the finished product. Optionally, the display insertion film may be thermoformed to a certain shape and die cut before being inserted into the mold.

The mold used for either of the two types of manufacturing process must be designed with the display panel insertion or transfer in mind. Gate locations must allow the display panel to be pressed up against the mold cavity to assure adequate thermal transfer through the various layers in the display panel. Also, the mold must be so designed that the electrodes of the display panel after the molding process may be exposed for subsequent connection to display driver and outside circuitries. In addition, mold flow and filling analysis should be performed prior to cutting of the mold material. A mold cooling analysis should also be considered to minimize mold hot spots. Finally the mold temperature settings must take into account the presence of the display panel.

The connectors which connect the display panel to outside circuit and driver are not shown in either FIG. 2a or FIG. 2b. The in-mold display transfer film or foil or the in-mold display insertion film or foil may be in the form of a roll.

Figure 4A:
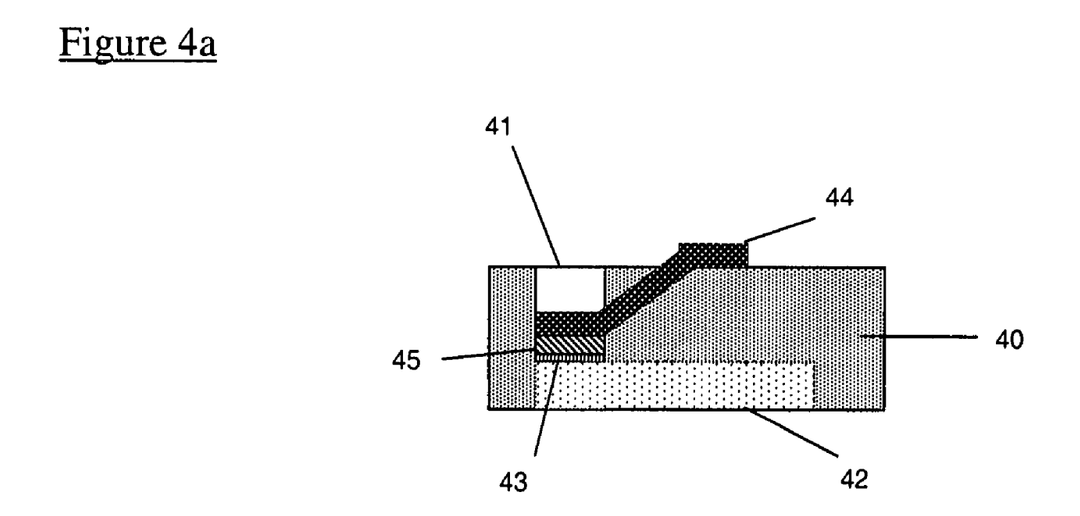
FIGS. 4a and 4b illustrate an object of the present invention having an inner cavity.

FIG. 4a is a cross-section view of a solid object with a display panel embedded in its top surface. The object (40) may have connection cavity in the form of open holes or slots (41) in the body as shown to allow connection of the display panel (42) to the required circuitries. The electrodes (43) of the display are routed and exposed through the holes or slots for driver connection. A flex cable (44), or other types of flexible connection harness, can be attached to the electrodes by either conductive adhesive (45), such as ACF, conductive PSA or silver paste, or mechanical clamping.

Figure 4B:
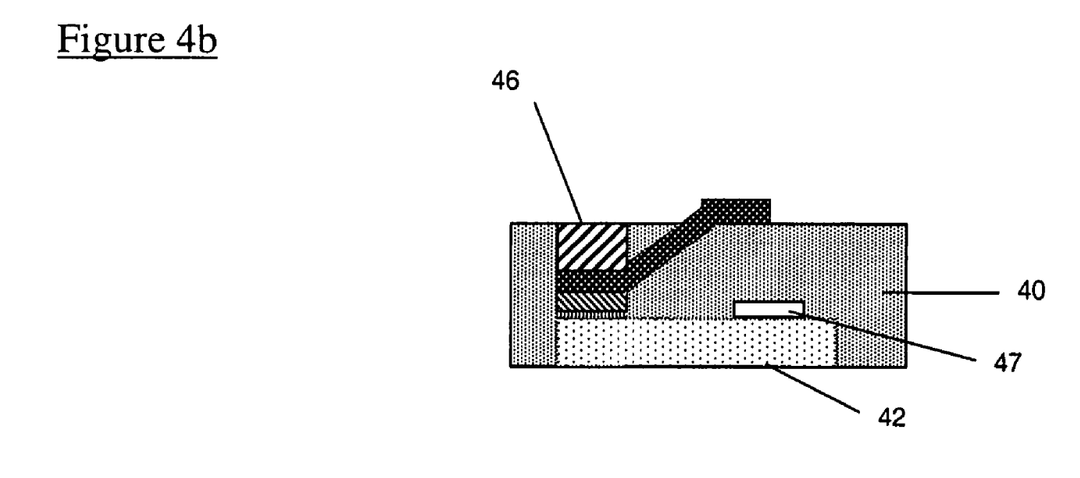

FIG. 4b illustrates a snap-in plug (46) that can be further inserted to secure the bonding area and enhance the reliability of the electrode connection. For a direct drive display, the common electrode is positioned on the viewing side, which is applied on the carrier film in the case of in-mold display insertion film or foil. The segment electrodes of the direct drive display are routed through vias (through holes) to the connection pads, which are positioned on the rear surface of the display. For an active matrix display, the common electrode is positioned on the viewing side and the flexible active switching component layer is positioned at the non-viewing side. Signal connection pads are located on the rear surface of the display and connected to the active switching components through vias. For a passive matrix display, all row electrodes and column electrodes should be routed to the rear surface to ease the connection process. The routing can be achieved through vias or flexible circuit adaptors. In the three types of display, namely, direct drive, active matrix and passive matrix, the display drivers (47) can be optionally installed on the display to reduce the number of connection pads, which can further improve connection quality and reduce manufacturing cost.

Alternatively, the object may be formed by blow molding or thermoforming to create an inner cavity to accommodate the circuitries. For manufacturing an object by blow molding or thermoforming, the display transfer or insertion film is first placed into an open mold and held in place by, for example, vacuum or tension; the mold is then closed. The plastic material for forming the object is thermoformed or blown into the mold. The display panel, like in the injection or compression molding process, is adhered to and embedded in the top surface of the molded object such as a cup or bottle.

Alternatively the object may be formed by other molding processes such as compression molding, hot stamping or lamination.

(IV) Application of Decorative Designs

Text and/or graphic designs may also appear on the top surface of the object. The most common designs include brand names, logos or symbols or other decorative designs.

Traditional methods for adding decorative designs have included screen printing, pad printing, hot stamping, lamination and painting. These methods historically have been post-molding operations that require additional processing steps.

Figure 5:
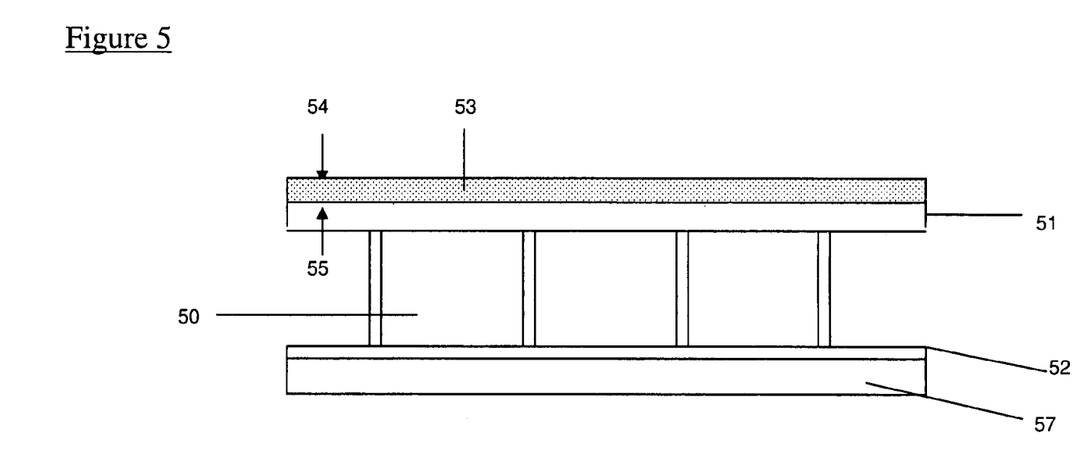
FIGS. 5 and 6 illustrate application of decorative designs to an object of the present invention.
Figure 6:
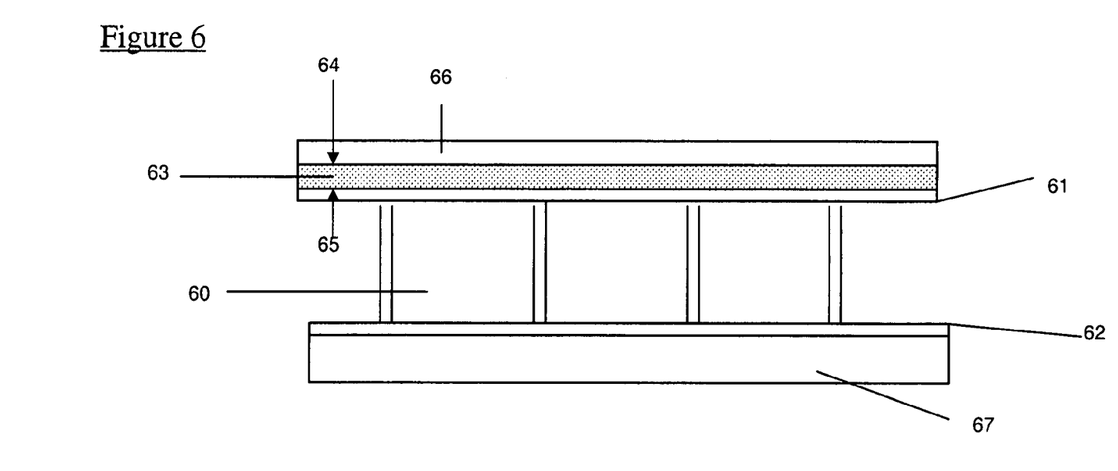

In recent years, alternative decoration methods, such as in-mold foil, insert molding or sublimation heat transfer has been used. FIGS. 5 and 6 illustrate the in-mold decoration processes.

FIG. 5 is an enlarged view of a display panel in an in-mold display transfer or insertion film. The display panel comprises a plurality of display cells (50), a top electrode layer (51), a bottom electrode layer (52) and a top plastic substrate layer (53). The decorative designs may be screen printed on the first surface (54) or the second surface (55, the back side) of the top plastic substrate layer. The bottom electrode layer (52) is disposed on a bottom substrate layer (57) which may be bonded to the plastic molded object (not shown) with an adhesive or a tie layer (not shown). The bottom substrate layer may be a plastic layer as described above or an insulator-coated metal or metal oxide foil formed from carbon steel, stainless steel, Al, Sn, Ni, Cu, Zn, Mg or an alloy or oxide thereof.

FIG. 6 shows an alternative in which the decorative designs are printed on the first surface (64) of the top plastic substrate layer (63) which is underneath the top durable layer (66) or on the second surface (65) of the top substrate layer (63) which is above the first electrode layer (61) of the display. If the decoration pattern is on the first surface (64), a durable layer (66) above is highly desirable to improve the hardness, scratch and oil resistance of the surface. Similar to the in-mold display film described in FIG. 5, the bottom electrode layer (62) is disposed on a bottom substrate layer (67) which may be bonded to the plastic molded object (not shown) with an adhesive or a tie layer (not shown). The bottom substrate layer may be a plastic layer as described above or an insulator-coated metal or metal oxide foil formed from carbon steel, stainless steel, Al, Sn, Ni, Cu, Zn, Mg or an alloy or oxide thereof.

The decorative designs may also be formed by thermoforming. In this case, the carrier film will become part of the molded object and the total decorative layer having raised or recessed patterns is typically in the range of about 0.2 to about 1 mm, preferably in the range of about 0.3 to about 0.7 mm in thickness. It is usually thermoformed from an ABS, polystyrene or PVC sheet in a mold.

Alternatively, the decorative layer may be also formed by high pressure forming involving the use of high-pressure air to create decorative designs on a film. The decorative layer may also be formed by hydroforming in which a hydrostatic bladder, rather than air, serves as the forming mechanism.

It should also be noted that the decorative layer prepared from either one of the methods described above must have the decorative designs strategically printed in areas which do not overlap with the display panel. In other words, the decorative designs should not interfere with the display image.

While the present invention has been described with reference to the specific embodiments thereof, it is understood that various changes may be made and equivalents may be substituted without departing from the true spirit and scope of the invention. In addition, many modifications may be made to adapt to a particular situation. All such modifications are intended to be within the scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An in-mold display transfer film or foil which comprises the following layers in sequence:
   (a) a temporary carrier film,
   (b) a release layer,
   (c) an optional durable layer,
   (d) a display panel, and (e) an adhesive or tie layer, wherein the display panel comprises a display device that is a flipping ball display, a liquid powder display, an electrophoretic display, an organic light emitting display, a polymer light emitting display, or a liquid crystal display; and wherein the temporary carrier film is in contact with the inner surface of a mold.

2. The in-mold display transfer film or foil of claim 1 wherein said temporary carrier film is a thin film of PET, PEN or PC.

3. The in-mold display transfer film or foil of claim 1 wherein said release layer is formed from wax, paraffin or silicone or a highly smooth and impermeable coating prepared from a radiation curable multifunctional acrylate, silicone acrylate, epoxide, vinyl ester, vinyl ether, allyl or vinyl, unsaturated polyester or a blend thereof.

4. The in-mold display transfer film or foil of claim 1 wherein said release layer comprises a condensation polymer, copolymer, blend or composite selected from the group consisting of epoxy, polyurethane, polyimide, polyamide, melamine formaldehyde, urea formaldehyde and phenol formaldehyde.

5. The in-mold display transfer film or foil of claim 1 wherein said optional durable layer is formed from a radiation curable multifunctional acrylate, epoxide, vinyl ester, diallyl phthalate, vinyl ether or a blend thereof.

6. The in-mold display transfer film or foil of claim 1 wherein said optional durable layer comprises a condensation polymer or copolymer.

7. The in-mold display transfer film or foil of claim 1 wherein said optional durable layer comprises a sol-gel silicate or titanium ester.

8. The in-mold display transfer film or foil of claim 1 wherein said adhesive layer is formed from polyacrylate, polymethacrylate, polystyrene, polycarbonate, polyurethane, polyester, polyamide, epoxy resin, ethylene vinylacetate copolymer, or thermoplastic elastomer or a copolymer, blend or composite thereof.

9. The in-mold display transfer film or foil of claim 1 wherein said adhesive layer is a hot melt or heat activated adhesive.

10. The in-mold display transfer film or foil according to claim 1, wherein said electrophoretic display is a microcup-based electrophoretic display.

11. The in-mold display transfer film or foil according to claim 1, wherein said liquid crystal display is a cholesteric liquid crystal display, a polymer dispersed liquid crystal display, or a microcup-based liquid crystal display.

12. An in-mold display insertion film or foil which comprises only one carrier layer, a display panel and an adhesive layer, wherein said display panel is between the carrier layer and the adhesive layer, wherein the display panel comprises a display device that is a flipping ball display, a liquid powder display, an electrophoretic display, an organic light emitting display, a polymer light emitting display, or a liquid crystal display; and wherein the carrier layer is in contact with the inner surface of a mold.

13. The in-mold display insertion film or foil of claim 12 wherein said display panel is formed directly on the carrier layer.

14. The in-mold display insertion film or foil according to claim 12, wherein said electrophoretic display is a microcup-based electrophoretic display.

15. The in-mold display insertion film or foil according to claim 12, wherein said liquid crystal display is a cholesteric liquid crystal display, a polymer dispersed liquid crystal display, or a microcup-based liquid crystal display.

* * * * *